UNITED STATES PATENT OFFICE.

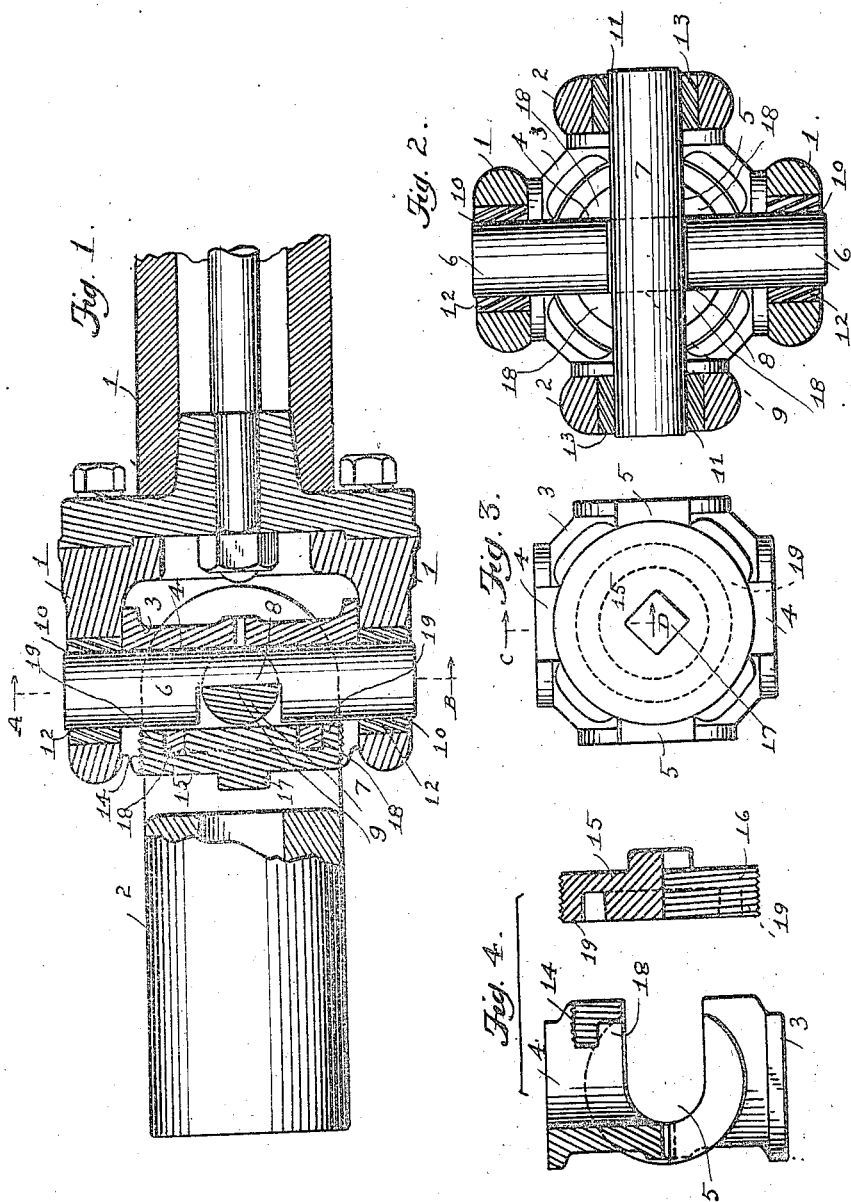

CHARLES E. PERKINS, OF GRAND RAPIDS, MICHIGAN.

UNIVERSAL JOINT.

1,211,484.  Specification of Letters Patent.  Patented Jan. 9, 1917.

Application filed October 12, 1916. Serial No. 125,150.

*To all whom it may concern:*

Be it known that I, CHARLES E. PERKINS, a citizen of the United States, residing at Grand Rapids, in the county of Kent and State of Michigan, have invented new and useful Improvements in Universal Joints, of which the following is a specification.

The present invention relates to universal joints, such as are employed to connect rotatable shafts not alined; and its object is to provide such a joint which shall be simple, and economical in construction; and further, such a joint whose parts may be easily assembled and disassembled. This, and any other objects hereafter appearing, are attained by, and the invention finds preferable embodiment in the structure hereinafter described and illustrated by the accompanying drawings, in which:—

Figure 1 is a view, principally in axial section, of a universal joint; Fig. 2 is a transverse section of the same taken on a plane corresponding to line A—B of Fig. 1, the connecting member not being sectioned and the nut being removed; Fig. 3 is a plan view of the connecting member with its nut; and, Fig. 4 is a side view of the same (the nut being shown in position ready to be screwed down), partly in section on a plane corresponding to line C—D of Fig. 3.

The shaft members 1, 2 (either of which may be the driven shaft) are connected by the connecting member 3 and the parts carried thereby. This connecting member has angularly disposed intersecting open sockets 4, 5 adapted to snugly receive respectively the spindles 6, 7 which are halved at 8, 9 in their middle portions, in order to receive each other. The end portions of the respective spindles rock in the rock bearings 10, 11 of the shaft members, which bearings, as shown, have the bushings 12, 13. The connecting member is threaded as at 14, on which threads the nut 15 threaded as at 16 may be turned so that when screwed down (as by applying a wrench to the squared portion 17) on the spindles in the sockets, such spindles are tightly and securely held by the nut in such sockets. The connecting member, as shown, has lugs 18 around or outside which the annular rib 19 of the nut engages when screwed down, in order to strengthen the parts. It will be seen that when the nut is screwed off, the spindles may be separated and also the shaft members. It will also be seen that the spindles are inserted into and removable from their sockets in a lateral direction.

The invention being intended to be defined solely by the claims, is not to be limited to or by details of construction shown or described.

I claim:

1. In a universal joint; shaft members having rock bearings; a threaded connecting member therefor having open sockets angularly disposed; spindles adapted to be laterally-removably held in the sockets and rocking in said bearings; and a nut threaded on the connecting member's threads and adapted to hold the spindles tightly in the sockets.

2. In a universal joint; shaft members having rock bearings; a threaded connecting member therefor having open sockets angularly disposed, and lugs; and a nut threaded on the connecting member's threads and adapted to hold the spindles tightly in the sockets, and having an annular rib adapted to engage outside the lugs.

3. In a universal joint; shaft members having rock bearings; a threaded connecting member therefor having open sockets angularly disposed; spindles halved in their middle portions to receive each other, and adapted to be laterally-removably held in the sockets, and rocking in said bearings; and a nut threaded on the connecting member's threads and adapted to hold the spindles tightly in the sockets.

4. In a universal joint; shaft members having rock bearings; a threaded connecting member therefor having intersecting open sockets angularly disposed; spindles halved in their middle portions to receive each other, and adapted to be laterally-removably held in the sockets, and rocking in said bearings; and a nut threaded on the connecting member's threads and adapted to hold the spindles tightly in the sockets.

In testimony whereof I have hereunto set my hand in presence of two subscribing witnesses at Grand Rapids, Michigan, this 10th day of October, A. D. 1916.

CHARLES E. PERKINS.

Witnesses:
CYRUS W. RICE,
DOROTHY M. FIELD.